United States Patent [19]

Krieger

[11] 4,435,358
[45] Mar. 6, 1984

[54] MEANS FOR FIXATION OF SPENT NUCLEAR ELEMENTS

[75] Inventor: Friedrich Krieger, Würzburg, Fed. Rep. of Germany

[73] Assignee: Gg. Noell GmbH, Würzburg, Fed. Rep. of Germany

[21] Appl. No.: 259,638

[22] Filed: May 1, 1981

[30] Foreign Application Priority Data

Feb. 6, 1980 [DE] Fed. Rep. of Germany ....... 3004274

[51] Int. Cl.[3] .............................................. G21F 7/00
[52] U.S. Cl. .................. 376/272; 250/506.1; 376/285
[58] Field of Search ............................ 376/272, 285; 250/506.1, 507.1

[56] References Cited

U.S. PATENT DOCUMENTS 4,088,897 5/1978 Soot ..................................... 376/272
4,356,062 10/1982 Bosshard ............................. 376/272

FOREIGN PATENT DOCUMENTS 2822397 9/1979 Fed. Rep. of Germany ...... 376/272
2440600 7/1980 France ................................ 376/272

Primary Examiner—Harvey E. Behrend
Attorney, Agent, or Firm—Horst M. Kasper

[57] ABSTRACT

A storage device for nuclear plants for storing spent fuel elements in such a way as to preclude relative movement between the walls of the element storing chamber and the fuel element. The invention contemplates storing chambers whose cross-section is square and fuel elements in the shape of four sided prisms. At least two opposite guide surfaces are arranged obliquely to the longitudinal axis of the storing chamber and to the longitudinal axis of the fuel element to be stored therein. These guide or guiding surfaces are positioned near the bottom of the storing chamber. The guiding surfaces are adapted to engage the lower edge of the fuel element placed in the storage chamber and to impart a rotary motion to the former so that its four longitudinal edges engage the wall of the storage chamber. In this position no impact between the walls of the storage chamber and the spent fuel element can occur.

5 Claims, 2 Drawing Figures

MEANS FOR FIXATION OF SPENT NUCLEAR ELEMENTS

BACKGROUND OF THE INVENTION

This invention relates to structures for receiving and storing four sides spent fuel elements, or fuel rods, in nuclear power plants.

Such structures include one, and more generally a plurality of chambers, which are square in cross-section. Each of said chambers is intended to receive and store a spent fuel element.

When such a structure is subjected to horizontal forces, as may occur during earthquakes, violent collisions may occur between the chamber wall and the fuel element which the chamber houses. To avoid such collisions, storage devices for spent fuel elements are provided with means for preventing relative movements between the walls of a storage chamber and a fuel element stored therein.

The present invention relates to a store device of the above description which is provided with simple and cost-effective means for precluding relative movements between the walls of a storage chamber and a spent fuel element that is stored in it.

SUMMARY OF THE INVENTION

The novel feature according to this invention comprises at least two opposite guide surfaces inside each chamber for receiving and storing a spent fuel element. Each of said guide surfaces is oblique to the longitudinal axis of the fuel element receiving chamber and adapted to engage two opposite points at the bottom of any fuel element therein and to cause engagement between each of the four edges of a fuel element and one of the walls of the chamber by imparting a rotary motion to the fuel element around the longitudinal axis of the chamber. Thus the fuel element is immobilized inside the storage chamber thereof.

DESCRIPTION OF THE PREFERRED EMBODIMENT OF THE INVENTION

Figure 2:
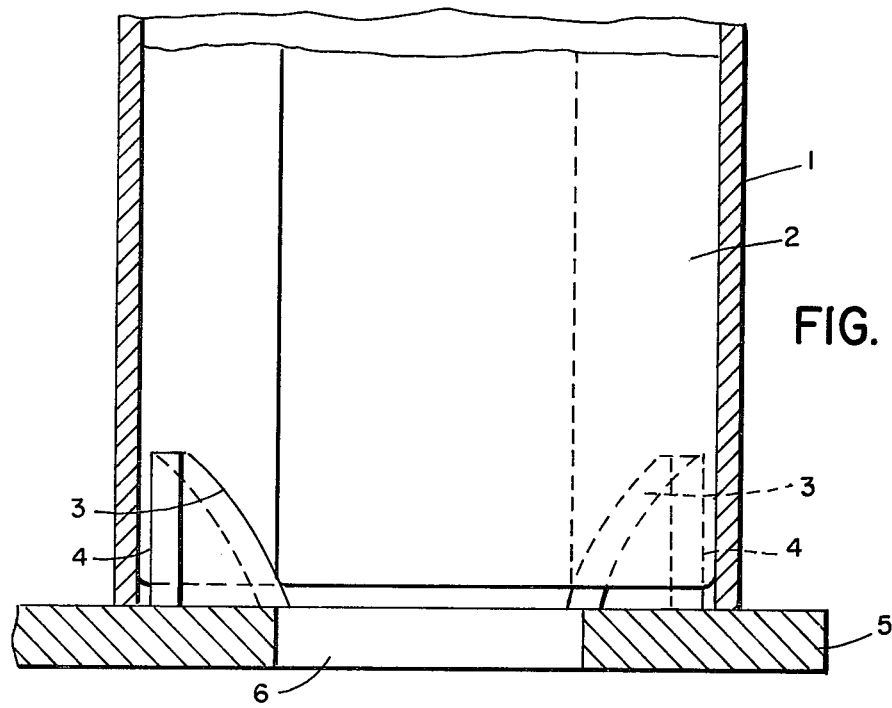
FIG. 2 shows the structure of FIG. 1 mainly in longitudinal section along I—I of FIG. 1.

Numeral 1 has been applied to indicate a chamber for receiving a fuel element 2. The form of chamber 1 is square in a horizontal cross-section, and the spent fuel element has the shape of a four sided prism. The guide surfaces 3 for the fuel element 2 are arranged inside of chamber 1 between the wall thereof and fuel element 2. They are arranged on opposite sides of chamber 1 and engage fuel element 2 on opposite sides thereof. Each of guide surfaces 3 is arranged obliquely to the longitudinal axis of chamber 1 and adapted to engage two opposite points on the bottom of any fuel element 2 inside of chamber 1, and to cause engagement between each of the four edges of fuel element 2 and one of the side walls of chamber 1 by imparting a rotary motion to the fuel element around the longitudinal axis of said chamber. The guide surfaces 3 form part of metal blocks 4 which are affixed to base plate 5, preferably by welding. Base plate 5 defines a circular aperture 6 for the admission of a cooling medium, such as water, into chamber 2.

Figure 1:
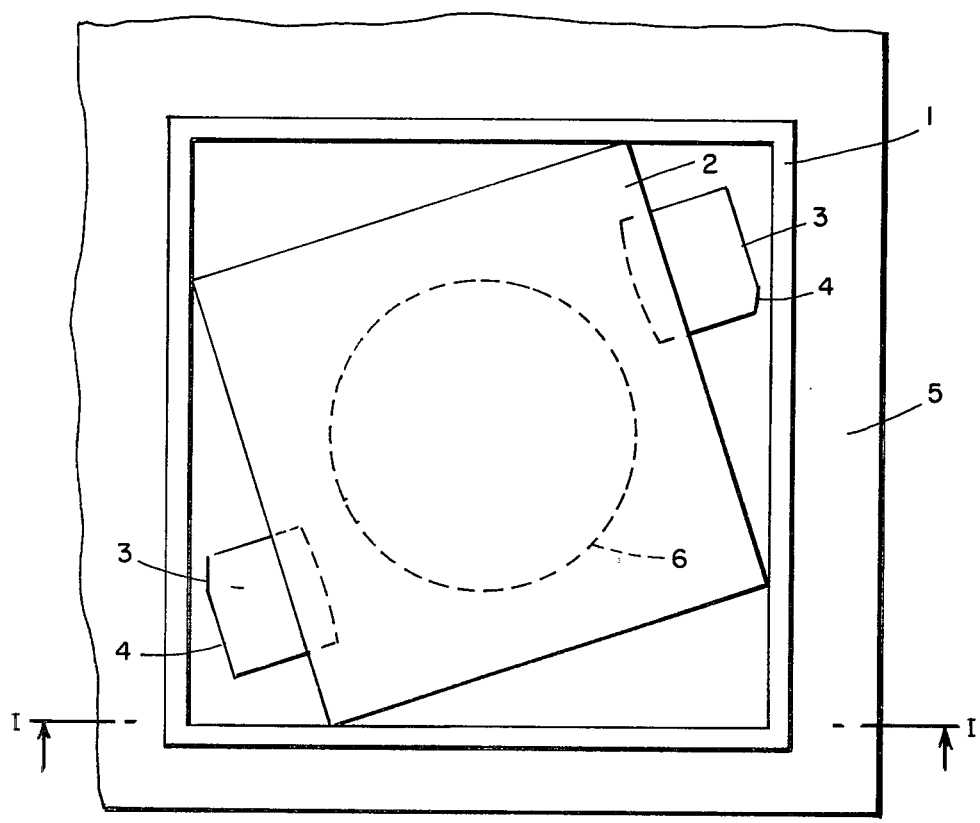
FIG. 1 is a top plan view of a fuel element secured inside of a chamber according to the present invention.

Guide surfaces 3 are arranged in the region of the ends of a diagonal plane extending from the lower left to the upper right of chamber 2 as seen in FIG. 1. In other words, guide surfaces 3 are arranged near to two diagonally opposed edges of chamber 2. As clearly shown in FIG. 1 of the drawing, guide surfaces 3 are not planar but curved and their gradient decreases from the bottom near plate 5 toward the top thereof. Preferably guide surfaces 3 are also crowned.

When it is intended to insert a fuel element 2 into chamber 1 it is placed on guide surfaces 3 of block 4. Due to its own weight the fuel element 2 slides along guide surfaces 3 and rotates. That rotary motion around its longitudinal axis and that of chamber 1 ends when its four longitudinal edges engage the four lateral walls of chamber 1. This precludes any impact of fuel element 2 on the walls of chamber 1 under the action of horizontal forces.

I claim as my invention:

1. In a nuclear fuel storage device for receiving and storing in nuclear power plants a four sided spent fuel element, a structure including at least one chamber square in cross-section, said structure also including means for preventing relative movements between the walls of the chamber and the fuel element therein wherein the novel feature comprises at least two guided surfaces inside the chamber engaging the bottom of the fuel element at opposite sides thereof, each of the guide surfaces being oblique in regard to the longitudinal axis of the chamber and adapted to cause engagement between each of the four edges of a fuel element and one of the walls of the chamber by imparting a rotary motion to the fuel element around the longitudinal axis of the chamber.

2. A structure as specified in claim 1 wherein said guide surfaces are arranged in the region of the ends of a diagonal plane of said chamber.

3. A structure as specified in claim 1 wherein said guide surfaces are arranged in the region of two diagonally opposed edges of said chamber.

4. A structure as specified in claim 1 wherein said guide surfaces are curved and wherein their gradient decreases from the bottom of said chamber in the direction of the top thereof.

5. A structure as specified in claim 1 wherein each of said guide surfaces is crowned.

* * * * *